May 9, 1939.　　　　J. G. DAVIDSON　　　　2,157,384
PHOTOGRAPHIC FILM BASE
Filed Nov. 7, 1936
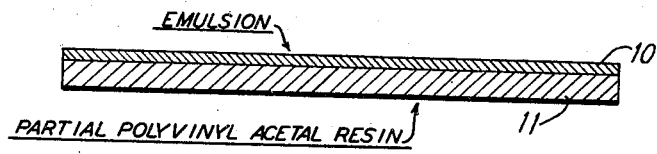
INVENTOR
JOSEPH G. DAVIDSON
BY
ATTORNEY Patented May 9, 1939

2,157,384

UNITED STATES PATENT OFFICE 2,157,384

PHOTOGRAPHIC FILM BASE

Joseph G. Davidson, Scarsdale, N. Y., assignor to Carbide and Carbon Chemicals Corporation, a corporation of New York Application November 7, 1936, Serial No. 109,667

13 Claims. (Cl. 95—9)

This invention relates to a film base such as is commonly employed for the support of photographic emulsions. It provides an improved material of this class which possesses many desirable features not heretofore found in photographic film bases.

The materials used in the past have been of the rigid type, such as glass, or of the flexible type which includes those formed of plasticized cellulose nitrate (Celluloid) and cellulose acetate. The use of glass for this purpose is very limited because its fragility, weight, and bulkiness render it difficult to handle, and it is impossible to use glass photographic supports under many conditions, such as in the production of motion pictures. Celluloid is highly inflammable, but it is used at present to a large extent as a base for photographic films which are not subjected to heat. To overcome this fire hazard, particularly in moving picture machines where the film is severely heated, films formed of cellulose acetate have been substituted for Celluloid, and the products of this type are known as safety film.

However, the only advantage cellulose acetate has over plasticized cellulose nitrate (Celluloid) is its slow-burning characteristics, and owing to its lack of toughness it has been adopted only where safety is a factor. No plasticizer has ever been found for cellulose acetate which imparts to it the properties which camphor gives to the nitrate. Most of the best plasticizers for cellulose acetate, such as dimethyl or diethyl phthlates or triacetin, have relatively high vapor pressures. Accordingly, plasticized cellulose acetate films tend to become brittle with age, and this brittleness can be overcome only by humidifying the film prior to use.

The ideal photographic film base should be transparent, water-proof, tough, flexible, non-explosive and slow-burning, and should hold its dimensions when stressed under fairly high temperatures. It should have no cold flow or permanent stretch under small stresses, or shrinkage on storage, and should not react with photographic emulsions. It should be readily soluble in cheap solvents so that fabrication into sheets may be accomplished by casting (spreading a solution to a uniform depth upon a smooth surface and removing the film upon evaporation of the solvent), and its surface should possess resistance to scratching.

It is an object of this invention to provide material which meets the requirements specified above more nearly than any film support proposed heretofore.

The object of this invention may be accomplished by the use of transparent films made of certain partial polyvinyl acetal resins; that is, polyvinyl resins in which there are both acetal and hydroxyl groups, but substantially no others. These resins are thermoplastic materials which are adequately resistant to moisture, and which are inert with respect to photographic emulsions or chemicals used in their manufacture or development. Sheets made from the partial polyvinyl acetal resins of this invention have been found to possess more nearly the characteristics desired in an ideal film base than do any other of the available materials for this use.

The accompanying drawing diagrammatically illustrates the invention, in which the emulsion 10 is supported upon the film base 11. The film base 11 is made of the partial polyvinyl acetal resins described herein, and the emulsion 10 may contain particles of silver or light-sensitive salts, or it may comprise any cinematographic image.

These partial polyvinyl acetal resins give tough films even when unplasticized, and they are less thermoplastic than the corresponding vinyl ester resins. For the most satisfactory results the films are made from partial polyvinyl acetal resins which have a high average macromolecular weight. Generally, those resins made from polyvinyl alcohol, or a polyvinyl ester, having an average molecular weight of at least 7,000 are desirable, and resins made from polyvinyl alcohol, or esters having molecular weights of about 7,000 to about 12,000 are preferred. Those resins derived from polyvinyl bodies of molecular weights in excess of about 25,000 are stronger, and are more desirable when it is necessary to produce exceptionally tough films. (Molecular weights referred to herein are calculated by means of Staudinger's formula from viscosity determinations on solutions of the materials.) Such resins are, in general, insoluble in water, but are soluble in alcohols and water-alcohol mixtures.

The thermoplasticity of these resins is proportional to both the quantity and molecular weight of the aldehyde reacted with the polyvinyl alcohol. The more aldehyde that is reacted, the more thermoplastic the resins become, so that completely reacted polyvinyl acetal resins have about the same thermoplasticity as the corresponding polyvinyl esters. In a similar manner, the longer the aldehyde chain that is reacted the more thermoplastic the resins become until the partial acetal resins of six and seven carbon atom aldehydes are as thermoplastic as the complete acetals of the lower aldehydes.

Water absorption of the resins is also related directly to the amount and molecular weight of the aldehyde reacted. For example, the partial polyvinyl acetals of formaldehyde have very high water absorption, while partial polyvinyl acetal resins acetalized with an aldehyde of higher molecular weight have lower water absorption.

The aldehydes used may be of any type. Both aromatic and aliphatic are useful, but the aliphatic aldehydes are preferred. Saturated aliphatic aldehydes result in products which are more desirable than the unsaturated aldehydes, and, in general, the straight-chained saturated aliphatic aldehydes containing from two to six carbon atoms are preferred. Examples of specifically suitable resins are the partial polyvinyl acetals of acetaldehyde, propionaldehyde, butyraldehyde, valeraldehyde, and hexaldehyde, although crotonaldehyde, benzaldehyde, aldol, and other aldehydes may be used. It is possible, of course, to make partial polyvinyl acetals in which two or more different aldehydes are combined in the same polymeric molecule. Of these various resins, those formed from propionaldehyde and butyraldehyde are preferred.

The degree to which the hydroxyl groups of the polyvinyl alcohol have been combined with aldehyde may be indicated directly as percent (%) acetalization, and the optimum degree of acetalization for the resins of this invention is from about 33% to 80%. Since both the quantity and kind of aldehyde used influence the characteristics of the resin, the preferred composition for a resin from any particular aldehyde would be somewhat more limited than the general range given above. For example, the preferred range for propionaldehyde and butyraldehyde is approximately 50% to 80% acetalization, while for a hexaldehyde resin the preferred range is from about 33% to about 50%.

The partial polyvinyl acetal resins may be prepared by any of the many known ways, and these resins are suitable for use in this invention however they are made. For example, the aldehyde may be reacted directly with the polyvinyl alcohol in the presence of an acidic substance, or the partial acetal may be formed from a vinyl ester by the simultaneous alcoholysis of the ester and partial acetalization of the polyvinyl alcohol formed. Resins made by the latter method were employed in the development of this invention.

The following examples are given by way of illustration.

*Example I*

A resin was prepared by mixing together the following materials and allowing the solution as prepared to stand for 48 hours at 30° C.

| | Parts by weight |
|---|---|
| High viscosity polyvinyl acetate resin | 774 |
| Propionaldehyde | 307 |
| Methanol | 5,418 |
| Sulfuric acid | 360 |

At the end of 48 hours the resin was precipitated with water, redissolved in methanol, neutralized, and further purified by several precipitations. Analysis showed the resin to be approximately 58% acetalized.

*Example II*

A resin was prepared and purified by the method given in Example I. The following materials were used in its preparation.

| | Parts by weight |
|---|---|
| High viscosity polyvinyl acetate resin | 774 |
| Butyraldehyde | 381 |
| Methanol | 5,418 |
| Sulfuric acid | 360 |

Analysis indicated the resin to be about 66% acetalized.

*Example III*

A resin was prepared from the following materials by a procedure similar to that used in Example I.

| | Parts by weight |
|---|---|
| Medium viscosity polyvinyl acetate resin | 225 |
| Butyraldehyde | 105 |
| Methanol | 1,750 |
| Sulfuric acid | 110 |

By analysis the resin was about 62% acetalized.

*Example IV*

A resin was prepared from the following materials by a procedure similar to that used in Example I.

| | Parts by weight |
|---|---|
| Medium viscosity polyvinyl acetate resin | 120.0 |
| Methanol | 950.0 |
| Propionaldehyde | 87.6 |
| Sulfuric acid | 60.0 |

The resin, upon analysis, was found to be about 70% acetalized.

If the resins are to be used for moving picture films, a resin prepared as in Examples I or IV would be suitable. On the other hand, roll or cut films, that are not subjected to as high temperature as moving picture films may be made from Examples II or III.

Since these resins possess a high degree of clarity, films made from them are not limited to any particular thickness, and they may be fabricated from the resin by any of the usual methods known in the art, such as calendering, casting etc. However, for the sake of economy, the films need not be made thicker than those now used for photographic emulsion supports unless unusual strength is necessary, and films even thinner have been found satisfactory. A particularly suitable thickness was found to be about 0.003 inch, or slightly thinner than the flexible photographic film bases now on the market.

This new photographic film support is much superior to prior art materials in that it is slow burning, sufficiently water-resistant, flexible, extremely tough, and highly resistant to deterioration. A surprising fact is that even though the resin contains combined aldehyde it is inert with respect to photographic emulsions and the chemicals used in processing films. Furthermore it does not distort under moderate stress at fairly high temperatures, has almost no cold flow or permanent stretch under small stresses, does not shrink on storage; and its surface is resistant to scratching.

Many compositions and types of photographic film may, of course, be made by this process. The film base, or support for the light-sensitive composition, may be made with any degree of translucency, although transparent film is generally preferred. Furthermore the composition, or coating, borne by the film base, either before or after photochemical reaction and subsequent developing and fixing, may vary in degree of translucency from transparency to complete opacity. Such variations in the coating are, of course, generally produced by the inclusion in the coating of substantially opaque, minute particles containing silver.

Various modifications will suggest themselves to those skilled in the art, and such variations are included within the scope of this invention as defined by the appended claims.

I claim:

1. A non-explosive, slow-burning photographic film base having the properties of toughness, clarity and retention of flexibility with age in an unusual degree, said film base comprising an artificial resin substantially identical with the water-insoluble product of the reaction of polyvinyl alcohol with an aldehyde, which product contains both acetal groups and polyvinyl alcohol hydroxyl groups and substantially no others.

2. A non-explosive, slow-burning photographic film base having the properties of toughness, clarity and retention of flexibility with age in an unusual degree, said film base comprising an artificial resin substantially identical with the water-insoluble product of the reaction of polyvinyl alcohol with a saturated aliphatic aldehyde, which product contains both acetal and polyvinyl alcohol hydroxyl groups and substantially no others.

3. A non-explosive, slow-burning photographic film base having the properties of toughness, clarity and retention of flexibility with age in an unusual degree, said film base comprising an artificial resin substantially identical with the water-insoluble product of the reaction of polyvinyl alcohol with a saturated, straight-chain aliphatic aldehyde, which product contains both acetal and polyvinyl alcohol hydroxyl groups and substantially no others.

4. A non-explosive, slow-burning photographic film base having the properties of toughness, clarity and retention of flexibility with age in an unusual degree, said film base comprising an artificial resin substantially identical with the water-insoluble product of the reaction of polyvinyl alcohol with propionaldehyde, which product contains both acetal and polyvinyl alcohol hydroxyl groups and substantially no others.

5. A non-explosive, slow-burning photographic film base having the properties of toughness, clarity and retention of flexibility with age in an unusual degree, said film base comprising an artificial resin substantially identical with the water-insoluble product of the reaction of polyvinyl alcohol with butyraldehyde, which product contains both acetal and polyvinyl alcohol hydroxyl groups and substantially no others.

6. A non-explosive, slow-burning photographic film base having the properties of toughness, clarity and retention of flexibility with age in an unusual degree, said film base comprising a partial polyvinyl acetal resin in which the polyvinyl alcohol has been acetalized from about 33 percent to about 80 percent.

7. As an article of manufacture, a non-explosive, slow-burning photographic film base having the properties of toughness, clarity and retention of flexibility with age in an unusual degree, said film base comprising a partial polyvinyl acetal resin in which the polyvinyl alcohol has been acetalized from about 50 percent to about 80 percent with propionaldehyde and having an average macromolecular weight of at least 10,000.

8. As an article of manufacture, a non-explosive, slow-burning photographic film base having the properties of toughness, clarity and retention of flexibility with age in an unusual degree, said film base comprising a partial polyvinyl acetal resin in which the polyvinyl alcohol has been acetalized from about 50 percent to about 80 percent with propionaldehyde and having an average macromolecular weight of at least 25,000.

9. As an article of manufacture, a non-explosive, slow-burning photographic film base having the properties of toughness, clarity and retention of flexibility with age in an unusual degree, said film base comprising a partial polyvinyl acetal resin in which the polyvinyl alcohol has been acetalized from about 50 per cent to about 80 percent with butyraldehyde and having an average macromolecular weight of at least 10,000.

10. A film comprising a non-explosive, slow-burning film base bearing a coating which varies in degree of translucency from transparency to opacity due to the presence in the coating of substantially opaque particles containing silver, said film base having the properties of toughness, clarity and retention of flexibility with age in an unusual degree, and said film base comprising a partial polyvinyl acetal resin in which the polyvinyl alcohol has been acetalized between 50% and 80% with propionaldehyde.

11. A film comprising a non-explosive, slow-burning film base bearing a coating which varies in degree of translucency from transparency to opacity due to the presence in the coating of substantially opaque particles containing silver, said film base having the properties of toughness, clarity and retention of flexibility with age in an unusual degree, and said film base comprising a partial polyvinyl acetal resin in which the polyvinyl alcohol has been acetalized between 50 percent and 80 percent with butyraldehyde.

12. As an article of manufacture, a non-explosive, slow-burning film consisting of a translucent coating produced from a light-sensitive photographic emulsion supported on the surface of a film base which is inert to photographic emulsions and to chemicals used in processing films, said film base having the properties of toughness, clarity and retention of flexibility with age in an unusual degree, and said film base comprising a water-insoluble polyvinyl acetal resin containing acetal and polyvinyl alcohol hydroxyl groups and substantially no others.

13. A non-explosive, slow-burning film base particularly adapted for use in moving picture film, said film base having the properties of toughness, clarity and retention of flexibility with age in an unusual degree under the conditions to which moving picture film is subjected, said film base comprising an artificial resin substantially identical with the product of the reaction of polyvinyl alcohol with propionaldehyde, which product is acetalized from about 58 percent to about 70 percent, and which product contains additionally polyvinyl alcohol hydroxyl groups and substantially no others.

JOSEPH G. DAVIDSON.